(12) United States Patent
Stancu et al.

(10) Patent No.: US 7,936,083 B2
(45) Date of Patent: May 3, 2011

(54) SYSTEMS AND METHODS FOR MULTIPLE SOURCE POWER CONVERSION

(75) Inventors: Constantin C. Stancu, Anaheim, CA (US); Robert T. Dawsey, Torrance, CA (US); Mark L. Selogie, Manhattan Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 12/117,543

(22) Filed: May 8, 2008

(65) Prior Publication Data

US 2009/0278405 A1 Nov. 12, 2009

(51) Int. Cl.
*B06L 1/00* (2006.01)
*H02J 1/00* (2006.01)

(52) U.S. Cl. ............ 307/9.1; 307/10.1; 307/72; 307/75

(58) Field of Classification Search ............ 307/9.1, 307/10.1, 72–75; 180/65.21, 65.22, 65.245, 180/65.25, 65.26, 65.265, 65.275, 65.285; 903/907, 908, 944
See application file for complete search history.

(56) References Cited

U.S. PATENT DOCUMENTS

| | | | | |
|---|---|---|---|---|
| 5,751,150 | A * | 5/1998 | Rippel et al. | 324/537 |
| 5,998,885 | A * | 12/1999 | Tamor et al. | 307/10.1 |
| 6,208,540 | B1 | 3/2001 | O'Meara et al. | |
| 6,255,008 | B1 * | 7/2001 | Iwase | 429/9 |
| 6,321,145 | B1 * | 11/2001 | Rajashekara | 701/22 |
| 6,765,306 | B2 * | 7/2004 | Fattic | 290/40 C |
| 6,953,357 | B2 * | 10/2005 | Fukushima et al. | 439/271 |
| 7,057,376 | B2 * | 6/2006 | Cook et al. | 323/207 |
| 7,199,535 | B2 * | 4/2007 | Welchko et al. | 307/65 |
| 7,227,277 | B2 | 6/2007 | Chapman et al. | |
| 2002/0064697 | A1 * | 5/2002 | Sugiura et al. | 429/23 |
| 2003/0140880 | A1 * | 7/2003 | Kahlon et al. | 123/179.3 |
| 2006/0165393 | A1 * | 7/2006 | Yamada | 388/806 |
| 2006/0222910 | A1 * | 10/2006 | Aoyagi et al. | 429/12 |
| 2007/0088483 | A1 * | 4/2007 | Yoshida | 701/69 |

FOREIGN PATENT DOCUMENTS

EP 1322028 A2 * 6/2003

OTHER PUBLICATIONS

"Power Electronics and COntrol for Hybrid and Fuel Cell Vehicles", Kaushik Rajashekara, Delphi Corporation, Kokomo, Indiana. Copyright 2005 by Taylor and Francis Group.*

* cited by examiner

*Primary Examiner* — Fritz M Fleming
(74) *Attorney, Agent, or Firm* — Ingrassia Fisher & Lorenz, P.C.

(57) ABSTRACT

An embodiment of a system for multiple source power conversion is implemented in a vehicle that includes an alternating current (AC) power source and first and second direct current (DC) power sources. The system includes an inverter, a DC-to-DC converter, and a controller. The controller receives external commands, inverter feedback signals, and DC-to-DC converter feedback signals, and executes and inverter control algorithm and DC-to-DC converter control algorithm. An embodiment of a method for multiple source power conversion between an AC power source, and first and second DC power sources includes receiving external commands from a remote source, inverter feedback signals from an inverter, and DC-to-DC converter feedback signals from a DC-to-DC converter. The method also includes executing an inverter control algorithm and a DC-to-DC converter control algorithm to generate drive signals for the inverter and DC-to-DC converter, respectively, based on the received commands and feedback signals.

20 Claims, 4 Drawing Sheets

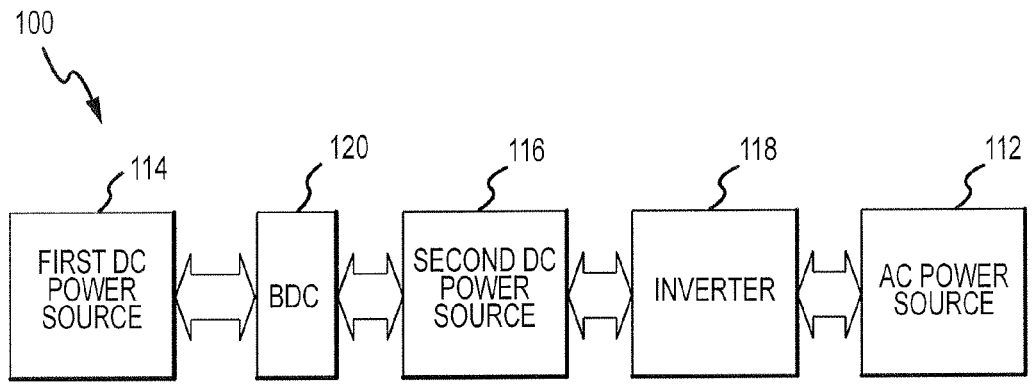

FIG.1

| | FIRST DC POWER SOURCE | SECOND DC POWER SOURCE | AC POWER SOURCE | POWER CONVERSION |
|---|---|---|---|---|
| 201 | + | + | + | MAY NOT NORMALLY OCCUR IN A CLOSED SYSTEM. |
| 202 | + | + | − | THE FIRST DC POWER SOURCE AND THE SECOND DC POWER SOURCE SUPPLY POWER TO THE AC POWER SOURCE. |
| 203 | + | − | + | THE FIRST DC POWER SOURCE AND THE AC POWER SOURCE SUPPLY POWER TO THE SECOND DC POWER SOURCE. |
| 204 | + | − | − | THE FIRST DC POWER SOURCE SUPPLIES POWER TO THE SECOND DC POWER SOURCE AND THE AC POWER SOURCE. |
| 205 | − | + | + | THE SECOND DC POWER SOURCE AND THE AC POWER SOURCE SUPPLY POWER TO THE FIRST DC POWER SOURCE. |
| 206 | − | + | − | THE SECOND DC POWER SOURCE SUPPLIES POWER TO THE FIRST DC POWER SOURCE AND THE AC POWER SOURCE. |
| 207 | − | − | + | THE AC POWER SOURCE SUPPLIES POWER TO THE FIRST DC POWER SOURCE AND THE SECOND DC POWER SOURCE. |
| 208 | − | − | − | MAY NOT NORMALLY OCCUR IN A CLOSED SYSTEM. |

FIG.2

SYSTEMS AND METHODS FOR MULTIPLE SOURCE POWER CONVERSION

TECHNICAL FIELD

Embodiments of systems and methods relate to power conversion in multiple sources, and more particularly to bidirectional power conversion among multiple power sources for use in electric vehicles and hybrid vehicles.

BACKGROUND

Electric vehicles and hybrid vehicles use multiple power supplies for systems that require interface of power from multiple power sources such as batteries, fuel cells, and a vehicle electric motor. Different power sources generally have different voltage and current characteristics, and interfacing the power sources can be complicated. In an application such as an electric vehicle or a hybrid electric vehicle, there can be many different combinations of the sources as they relate to electrical power transfer. For example, a battery may exchange power with a fuel cell or an electric motor may exchange power with a battery. Presently, the power sources have either a converter or an inverter for each source. Furthermore, an independent controller is used for each converter and inverter, which presents a need for additional components in order to control and condition the power from each of the sources. There is significant cost associated with the need for additional components. Also, the additional components take up valuable packaging space on the vehicle and can add to the overall weight of the vehicle, adversely affecting fuel efficiency.

Accordingly, it is desirable to provide a controllable power interface between at least two power sources for integration in an electric vehicle or a hybrid vehicle, which eliminates the quantity of power transfer, conversion, inversion, and/or control components, improves reliability, and/or lowers cost. Other desirable features and characteristics will become apparent from the subsequent detailed description and the appended claims, taken in conjunction with the accompanying drawings and the foregoing technical field and background.

SUMMARY

An embodiment includes a system for multiple source power conversion in a vehicle. The system includes an inverter, a DC-to-DC converter, and a controller. The inverter has a first direct current (DC) input/output (I/O) connector and an alternating current (AC) I/O connector. The first DC I/O connector is adapted to be coupled with a first DC power source, and the AC I/O connector is adapted to be coupled with an AC power source. The DC-to-DC converter has a second DC I/O connector and a third DC I/O connector, where the second DC I/O connector is coupled with the first DC I/O connector of the inverter. The third DC I/O connector is adapted to be coupled with the second DC power source. The controller is coupled to the inverter and the DC-to-DC converter, and is adapted to receive external commands, inverter feedback signals, and DC-to-DC converter feedback signals. The controller is also adapted to execute a first control algorithm for controlling the inverter and to execute a second control algorithm for controlling the DC-to-DC converter based on the external commands, the inverter feedback signals, and the DC-to-DC converter feedback signals.

Another embodiment includes an apparatus for multiple source power conversion in a vehicle. The apparatus includes a controller adapted to execute an inverter control algorithm and a DC-to-DC converter control algorithm, an inverter coupled to the controller and controlled by the inverter control algorithm, the inverter having a first DC I/O connector and an AC I/O connector, and a DC-to-DC converter coupled to the controller and controlled by the DC-to-DC converter control algorithm. The DC-to-DC converter shares the first DC I/O connector with the inverter and has a second DC I/O connector. The inverter control algorithm and the DC-to-DC converter control algorithm communicate variables within the controller for coordinating three-way power transfer among an AC power source, a first DC power source, and a second DC power source.

Another embodiment includes a method for multiple source power conversion between an AC power source, a first DC power source, and a second DC power source. The method is performed by a controller and includes the steps of receiving external commands from a remote source, receiving inverter feedback signals from an inverter, receiving DC-to-DC converter feedback signals from a DC-to-DC converter, executing an inverter control algorithm in order to generate first drive signals for the inverter based on the external commands and the inverter feedback signals, and executing a DC-to-DC converter control algorithm in order to generate second drive signals for the DC-to-DC converter based on the external commands and the DC-to-DC converter feedback signals.

Another embodiment includes a method of manufacturing a system for power conversion between multiple power sources in a vehicle that includes an AC power source and at least two DC power sources. The method includes the steps of electrically coupling together a controller, an inverter, and a bi-directional DC-to-DC converter (BDC), and storing an inverter control algorithm and a BDC control algorithm in a data storage device that is accessible to the controller.

BRIEF DESCRIPTION OF THE DRAWINGS

Embodiments of the inventive subject matter will hereinafter be described in conjunction with the following drawing figures, wherein like numerals denote like elements, and FIG. 1 is a simplified block diagram of a multiple source power conversion system, in accordance with an example embodiment;

FIG. 2 is a table of various power conversion combinations, in accordance with an example embodiment;

DETAILED DESCRIPTION

Figure 3:
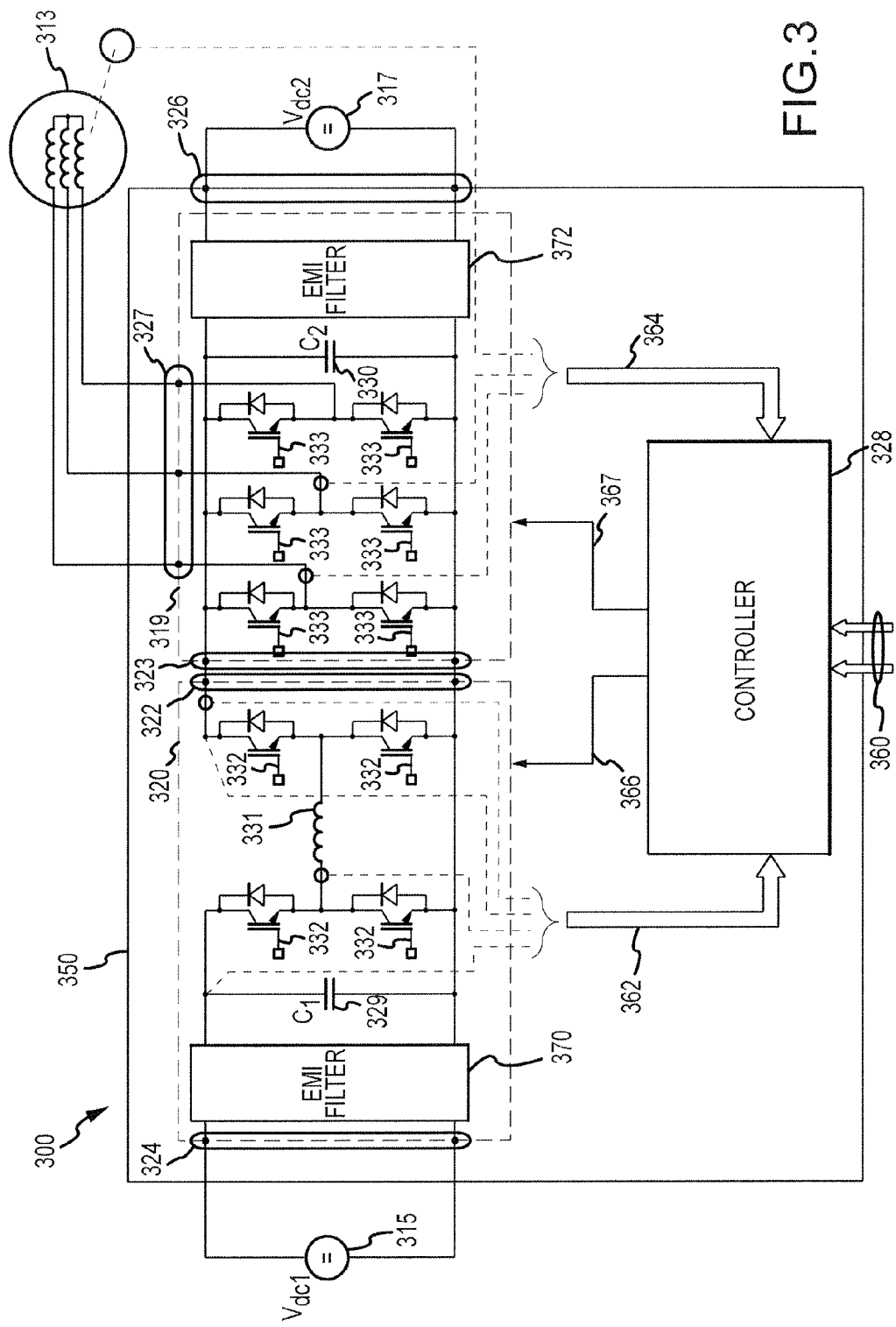
FIG. 3 is a simplified circuit diagram of a multiple source power conversion system, in accordance with an example embodiment.

The following detailed description is merely exemplary in nature and is not intended to limit the scope or the application and uses of the inventive subject matter. Furthermore, there is no intention to be bound by any expressed or implied theory presented in the preceding technical field, background, summary or the following detailed description. In the following description, like reference numbers relate to like elements in each of the Figures. Embodiments may be implemented in a variety of systems and apparatus, including but not limited to electric vehicles, hybrid vehicles, and other systems in which multiple power sources are used to provide power to an electric motor. Embodiments include systems and methods for performing bidirectional power conversion between a plurality of sources. A particular example embodiment, described in detail below, includes a system and method for performing bidirectional power conversion between three sources, although it is to be understood that other embodiments may include systems and methods for performing bidirectional power conversion between more than three sources.

FIG. 1 is a simplified block diagram of a multiple source power conversion system 100, in accordance with an example embodiment. More particularly, FIG. 1 shows a system 100 adapted to provide bidirectional power conversion among three sources: an alternating current (AC) power source 112 (e.g., an AC electric motor functioning as a traction device); a first direct current (DC) power source 114; and a second DC power source 116, in accordance with an example embodiment. The system 100 may be considered to be electrically isolated, in that sources 112, 114, or 116 normally would not transfer electrical energy to a device outside of the system.

For purposes of the discussion herein, the AC power source 112 may include a traction device such as an AC electric motor, the first DC power source 114 may include a fuel cell power module, and the second DC power source 116 may include a battery, as such sources apply to a fuel cell powered vehicle (e.g., an electric or hybrid vehicle). In another embodiment, the first DC power source 114 may include a battery, and/or the second DC power source 116 may include an ultracapacitor, also known as a supercapacitor or electrochemical double layer capacitor (EDLC). Either way, in order for the AC power source 112 to interface with the DC power sources 114, 116, system 100 also includes an inverter 118. Inverter 118 is operatively coupled between the AC power source 112 and the first and second DC power sources 114, 116. The inverter 118 may convert DC power from the DC power sources 114, 116 into AC power, and also may convert AC power from AC power source 112 into DC power, thus enabling the bidirectional interchange of power between the AC and DC power sources 112, 114, 116. In the example shown in FIG. 1, the first DC power source 114 (e.g., a fuel cell) supplies power to the AC power source 112 (e.g., an electric motor).

The second DC power source 116 (e.g., a battery) may supply additional power to the AC power source 112, such as when the AC power source 112 is in a traction mode (e.g., when the vehicle is changing speed). In addition, the first and second DC power sources 114, 116 may receive and store electrical power when the AC power source 112 is in a regenerating mode (e.g., when the vehicle is braking). In an embodiment, the first DC power source 114 and the second DC power source 116 may have different terminal voltages from each other. Accordingly, system 100 also may include a bidirectional DC-to-DC converter (BDC) 120 coupled between the first DC power source 114 and the second DC power source 116, which provides an interface between the first DC power source 114 and the second DC power source 116.

FIG. 2 is a table representing a variety of power conversion combinations 201, 202, 203, 204, 205, 206, 207, 208, which may be implemented in a power conversion system, such as the system 100 illustrated in FIG. 1, in accordance with various example embodiments. It is to be understood that not all of the power conversion combinations 201-208 may be possible for each and every possible embodiment of a power conversion system. For example, referring also to FIG. 1, in an embodiment in which the first DC power source 114 includes a fuel cell power module and the second DC power source 116 includes a battery, only power conversion combinations 202-204 may be relevant (e.g., power conversion combinations 205-207 may not be relevant), as a fuel cell generally is not adapted to absorb energy. In contrast, in an embodiment in which the first DC power source 114 includes a battery and the second DC power source 116 includes an ultracapacitor, each of power conversion combinations 202-207 may be relevant.

As discussed above, the system 100 may be electrically isolated and may not be adapted to transfer electrical energy to devices outside of the system 100. Accordingly, the power conversion combinations 201-208 contemplate only energy transfers between three power sources (e.g., first DC power source 114, second DC power source 116, and AC power source 112, FIG. 1). In the table of FIG. 2, a "+" sign indicates that a particular power source is generating and supplying power, and a "−" sign indicates that a particular power source is receiving and potentially storing power. A power conversion combination 201 in which all three power sources 112, 114, 116 are simultaneously generating power may not normally occur in such a closed system 100, although such a combination is included in FIG. 2 for completeness. Similarly, a power conversion combination 208 in which all three power sources 112, 114, 116 are simultaneously receiving and storing power likewise may not normally occur. In each of the other power conversion combinations 202-207, at least one power source is receiving power and at least one power source is generating power.

FIG. 3 is a simplified circuit diagram of a multiple source power conversion system 300, in accordance with an example embodiment. System 300 includes an AC power source 313, a first DC power source 315, a second DC power source 317, an inverter 319, a BDC 320, and a controller 328. In an embodiment, a single housing 350 may enclose each element described hereinafter in close proximity to each other, although the elements may be enclosed in multiple housings, in other embodiments.

Inverter 319 is electrically coupled to AC power source 313 and to second DC power source 317. The inverter 319 has first and second DC input/output (I/O) connectors 326, 323 and AC I/O connector 327. First DC I/O connector 326 is adapted to be coupled to second DC power source 317, and AC I/O connector 327 is adapted to be coupled to AC power source 313. The inverter 319 is adapted to convert AC power received via AC I/O connector 327 from AC power source 313 into DC power, which is provided to second DC power source 317 via DC I/O connector 326, and also to convert DC power received via DC I/O connector 326 from second DC power source 317 into AC power, which is provided to AC power source 313 via AC I/O connector 327. Accordingly, inverter 319 is adapted to provide bidirectional AC-to-DC and DC-to-AC power conversion between the AC power source 313 and the second DC power source 317.

BDC 320, also known as a bi-directional dual input converter, includes third and fourth DC I/O connectors 322, 324. BDC 320 may include physically separate hardware from the inverter 319, yet may be co-located within the housing 350, in an embodiment. In an alternate embodiment, the inverter (e.g., inverter 319) may be enclosed in a first housing, and a BDC (e.g., BDC 320) may be enclosed in a second housing. Referring to the embodiment illustrated in FIG. 3, the third DC I/O connector 322 of the BDC 320 is adapted to be coupled with the second DC I/O connector 323 of inverter 319, and vice versa. As illustrated in FIG. 3, third DC I/O connector 322 of the BDC 320 and second DC I/O connector 323 of inverter 319 are connected in parallel with the first DC I/O connector 326 of the inverter 319 across the second DC power source 317. In this manner, the third DC I/O connector 322 is electrically coupled to the first DC I/O connector 326 of the inverter 319. The fourth DC I/O connector 324 of the BDC 320 is connected across the first DC power source 315, in an embodiment.

BDC 320 is adapted to convert first DC power received via fourth DC I/O connector 324 from first DC power source 315 into second DC power, which is provided to second DC power source 317 via third and second DC I/O connectors 322, 323, respectively, and also to convert second DC power received via second and third DC I/O connectors 323, 322, respectively, from second DC power source 317 into first DC power, which is provided to first DC power source 315 via fourth DC I/O connector 324. Accordingly, bidirectional power transfer may occur between the first and second DC power sources 315, 317. Additionally, inverter 319 is adapted to provide bidirectional DC-to-AC power conversion between AC power source 313 and second DC power source 317.

Inverter 319 and BDC 320 may be implemented using high frequency switching devices, such as insulated gate bipolar transistors 333, 332 (IGBTs) as shown in FIG. 3, in an embodiment. In other embodiments, inverter 319 and/or BDC 320 may be implemented using other high frequency switching devices, such as metal-oxide-semiconductor field effect transistors (MOSFETs), integrated gate commutated thyristor (IGCTs) or other high frequency switching devices. Although IGBTs 332, 333 are illustrated and discussed below, it is to be understood that other types of switching devices may be used.

A controller 328, such as a programmable microprocessor or microcontroller, receives external commands 360, BDC feedback signals 362, and inverter feedback signals 364, and is adapted to execute an inverter control algorithm for controlling the inverter 319 and a BDC control algorithm for controlling the BDC 320. By implementing both control algorithms in the single controller 328, according to an embodiment, functional data, such as variables, may be shared easily and seamlessly between the inverter control algorithm and the BDC control algorithm. This allows the devices 313, 319, and 320 to be efficiently correlated and synchronized during operation. The inverter control and BDC control algorithms control the electrical energy conversion process for the inverter 319 and the BDC 320, respectively. Essentially, the inverter control and BDC control algorithms direct the controller to adjust a pulse-width modulated duty cycle of the IGBT switches 333 and 332, respectively, based on the external commands 360 and the feedback signals 362, 364, so that a load current is controlled in a closed-loop fashion. For the inverter 319, a load current at output 327 includes a three-phase motor current. Conversely, for the BDC 320, a load current includes the current in inductor 331.

External commands 360 may include, for example, motor speed/torque commands and DC-to-DC power/current commands. The commands 360 may include commands issued by a vehicle controller (not illustrated), which are generated in order to satisfy the vehicle's propulsion needs with power produced by the various power sources 313, 315, 317. The BDC control algorithm generates IGBT drive signals 366 for controlling the BDC based on the external commands 360 (e.g., DC-to-DC power/current commands) and the BDC feedback signals 362 from the BDC 320. Likewise, the inverter control algorithm generates IGBT drive signals 367 for controlling inverter 319 based on the external commands 360 (e.g., motor speed/torque commands) and the inverter feedback signals 364 from the inverter 319. Feedback signals 362, 364 may include, for example, signals such as currents, voltages, motor speed, power component temperatures, and/or any information that may be necessary for the execution of the inverter and BDC control algorithms.

In traditional systems, a converter and an inverter are each housed independently and are separated some physical distance from each other. Additionally, each device is controlled by its own microprocessor and the microprocessors are coupled to each other by way of wires and/or cables in order to transfer variables and information. Often times, the converter and inverter are located in widely separated locations in a vehicle, requiring lengthy cables to connect their controllers for communication with each other. In the multiple-source power conversion system 300 herein, two separate controllers are not required to communicate with each other as is done in the traditional systems. Therefore, the speed of the power conversion process is increased.

In an embodiment, controller 328 executes the inverter and BDC control algorithms in a cyclic manner. For example, during each switching cycle of the IGBTs 332, 333, the controller 328 may process external commands 360 and feedback signals 362, 364 according to the inverter and BDC control algorithms, and output IGBT drive signals 366, 367. In an embodiment, the IGBT switching cycle may be in a range of about 50 to 100 microseconds, although the IGBT switching cycle may be longer or shorter, in other embodiments. In an embodiment, during an IGBT switching cycle, controller 328 may first execute a portion of the inverter control algorithm for generating IGBT drive signals 367 based on control signals 360 and inverter feedback signals 364, and may then execute a portion of the BDC control algorithm for generating IGBT drive signals 366 based on control signals 360 and BDC feedback signals 362, or vice versa. In alternate embodiments, controller 328 may consume multiple switching cycles to perform the portions of the inverter control and BDC control algorithms. Either way, the controller execution of the inverter control algorithm and the BDC control algorithm for the inverter 319 and the BDC 320, respectively, may be performed sequentially during one or multiple switching cycles.

According to an embodiment, controller 328 includes a single microprocessor or microcontroller for executing the inverter control algorithm and the BDC control algorithm, which may be implemented using a single core or multiple-core processing engine. As explained above, traditional systems utilize two individual controllers, and these distinct controllers typically communicate with each other over a dedicated interface network. A typical interface used in the automotive industry is a Controller Area Network (CAN) bus, which is a two-wire, daisy chain implementation. In such a network, other controllers, in addition to the inverter controller and the BDC controller, may be accommodated on the network. With the plurality of controllers communicating via the network, communication speeds may be limited according to the network communication protocol. Embodiments described above, which are adapted to execute the inverter and BDC control algorithms in a single, common controller 328, eliminate the need for shared data to pass through a communication network such as a CAN. Any shared data between the inverter and BDC control algorithms may be made readily accessible to both algorithms in internal or otherwise shared memory accessible to the controller 328.

An advantage of controlling the inverter 319 and the BDC 320 using algorithms executed by the same controller 328 may be that the BDC 320 can increase and/or decrease its power output simultaneously with the inverter 319 power demands without the need to wait for a vehicle command 360 via a communication network. Another advantage may be that the BDC 320 and the inverter 319 may be synchronized to switch at the same frequency, yet out of phase to reduce power source 317 current and voltage ripple.

In an embodiment, system 300 also includes one or more DC bus capacitors 329, 330 and one or more electromagnetic interference (EMI) filters 370, 372. DC bus capacitors 329, 330 are adapted to provide DC bus voltage filtering, and the EMI filters 370, 372 are adapted to provide EMI filtering for the inverter 319 and the BDC 320. Traditional systems typically include DC bus capacitors and EMI filters at each converter/inverter DC I/O connector. For example, in a system with the converter and the inverter are at physically separate locations within a vehicle, a plurality of DC bus capacitors and EMI filters, interconnected by cables, typically are implemented (e.g., one or more DC bus capacitors and EMI filters in proximity to each of the converter and the inverter). This arrangement may generate undesired oscillations between the two DC bus capacitors and EMI filters and added inductance from the interconnecting cable. According to an embodiment, with the BDC 320 and the inverter 319 being located in close physical proximity (e.g., within the same housing 350), a single set of directly-connected DC bus capacitors 329, 330 and a single set of directly-connected EMI filters 370, 372 may be implemented, rather than utilizing DC bus capacitors and EMI filters that are interconnected by cables between the inverter and the converter, as in traditional systems. By housing the inverter 319 and BDC 320 together and operating them from a single controller 328, according to an embodiment, the cabling between the DC bus capacitors and EMI filters is substantially eliminated. Therefore, issues of inductance and potential oscillations as a result of cable connections are not a factor. In an alternate embodiment, in which the inverter (e.g., inverter 319) and the BDC (e.g., BDC 320) are enclosed in separate housings, one or more additional EMI filters and/or DC bus capacitors may be included within the system. In such an embodiment, the inverter and BDC still may be located in close enough proximity to one another to substantially eliminate cabling between the housings.

As discussed above, the inverter 319 and the BDC 320 are implemented using high frequency switching devices, shown as IGBTs 332 in FIG. 3. These devices may exhibit losses during normal operation and generate heat. In an embodiment, a single heat dissipation device (not illustrated) and a same cooling agent, either liquid or air, may be included within the system to dissipate heat generated by both the inverter 319 and the BDC 320. An advantage to this embodiment is that significant weight, packaging, and cost savings may be achieved over traditional systems that use multiple heat dissipation devices.

The combined system 300 of the inverter 319 and BDC 320 also may present other advantages in packaging space reduction and weight elimination. For example, as described previously, the same housing 350 may be used to enclose both of these devices 319, 320, in an embodiment, consequently reducing mass, volume, and weight.

Another advantageous reduction in mass and volume may be realized by sizing the capacitors of the EMI filters 370, 372 so that they satisfy the needs of both the inverter 319 and the BDC 320. As discussed above, the inverter 319 and the BDC 320 can be synchronized in switching operation so that current ripple generated by each device through the EMI filters 370, 372 may be out of phase. Accordingly, the current ripples may tend to cancel each other. Synchronization may be achieved by the controller 328 internally controlling both inverter 319 and BDC 320.

Yet another advantage may be realized in that hardware for connecting the inverter 319 to the BDC 320 may be reduced when compared with traditional systems. In an embodiment, the DC I/O connectors 323, 322 between inverter 319 and BDC 320 may occur within a single housing 350. In addition, DC I/O connectors 323, 323 may be collapsed into a single connection or pair of conductors, in an embodiment. Therefore, a fewer number of DC I/O connectors and/or simpler electronics may be used to couple the inverter 319 and the BDC 320.

Figure 4:
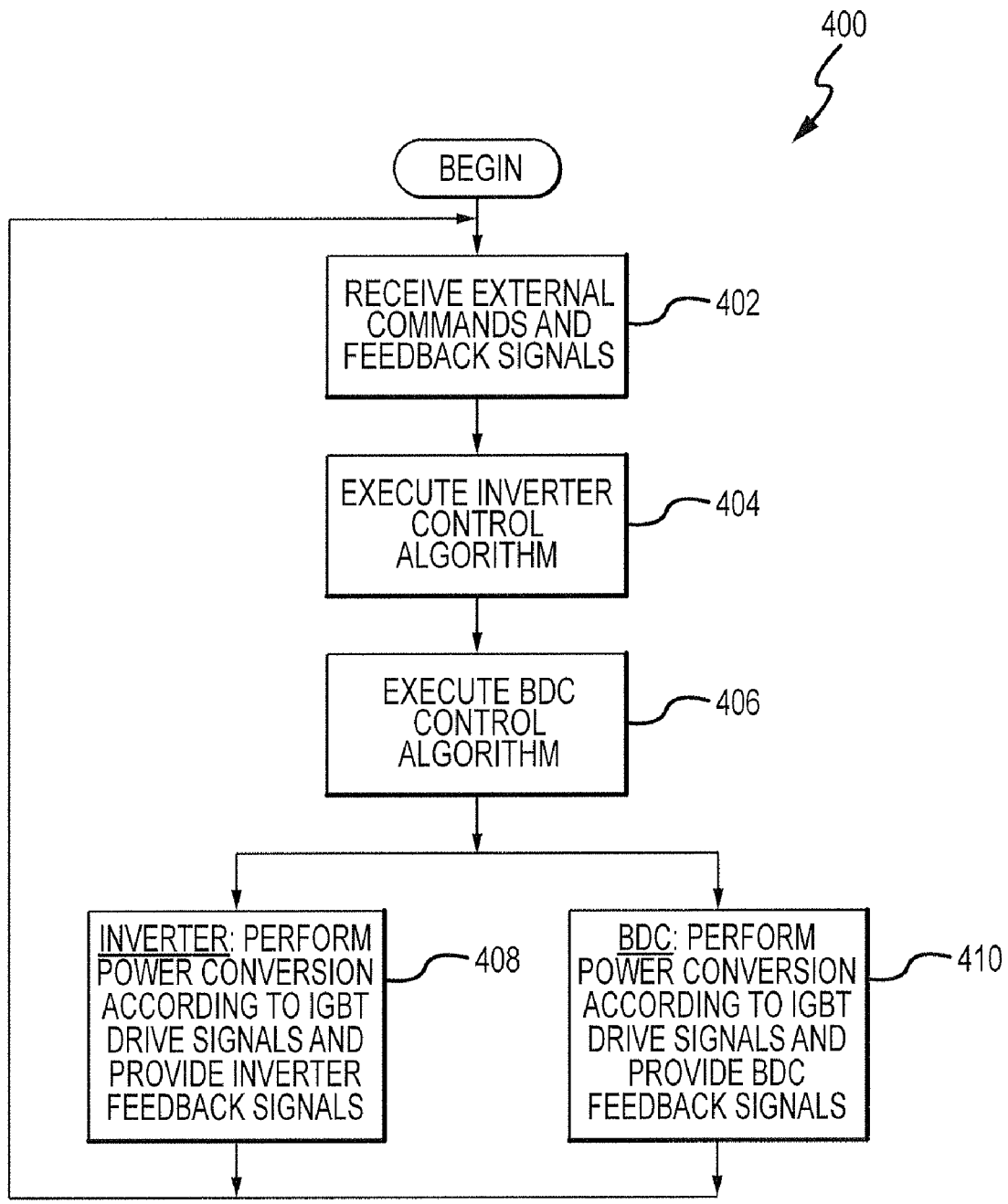
FIG. 4 is a flowchart of a method for performing multiple source power conversion, in accordance with an example embodiment.

FIG. 4 is a flowchart 400 of a method for performing multiple source power conversion, in accordance with an example embodiment. The description of the method of FIG. 4 makes reference to elements of FIG. 3, and therefore it may be convenient to view both figures together for better understanding. The method may begin, in step 402, when the controller (e.g., controller 328) receives, from a remote source such as a vehicle controller, external commands (e.g., external commands 360) which may be commands selected from a group of commands that includes motor speed commands, torque commands, DC-to-DC power commands, and/or current commands. The controller also receives feedback signals (e.g., inverter feedback signals 364 and BDC feedback signals 362) from an inverter (e.g., inverter 319) and a BDC (e.g., BDC 320), in an embodiment.

In block 404, the controller executes an inverter control algorithm, which generates IGBT drive signals (e.g., IGBT drive signals 367 for IGBTs 333) based on the external commands and the inverter feedback signals. In block 406, the controller executes a BDC control algorithm, which generates IGBT drive signals (e.g., IGBT drive signals 366 for IGBTs 332) based on the external commands and the BDC feedback signals. In the illustrated embodiment, the inverter control and BDC control algorithms are performed subsequent to one another. In alternate embodiments, they may be performed in a reverse order or in parallel with each other. In a particular embodiment, blocks 404 and 406 are performed within a single IGBT switching cycle, although they may be performed within multiple switching cycles, in other embodiments.

As discussed above, during execution of the inverter and BDC control algorithms, feedback, information, and variables may be passed between the inverter and BDC control algorithms in order to coordinate switching within the inverter and the BDC. For example, the coordinated control may include causing the BDC to increase and/or decrease its power output simultaneously with the inverter power demand. Another example may include synchronizing the inverter and the BDC to switch at the same frequency, but out of phase to reduce current and voltage ripple.

In block 408, the inverter performs AC-to-DC or DC-to-AC power conversion according to the IGBT drive signals, and provides the inverter feedback signals to the controller. Likewise, in block 410, the BDC performs DC-to-DC power conversion according to the IGBT drive signals, and provides BDC feedback signals to the controller. The method may then iterate as shown.

Figure 5:
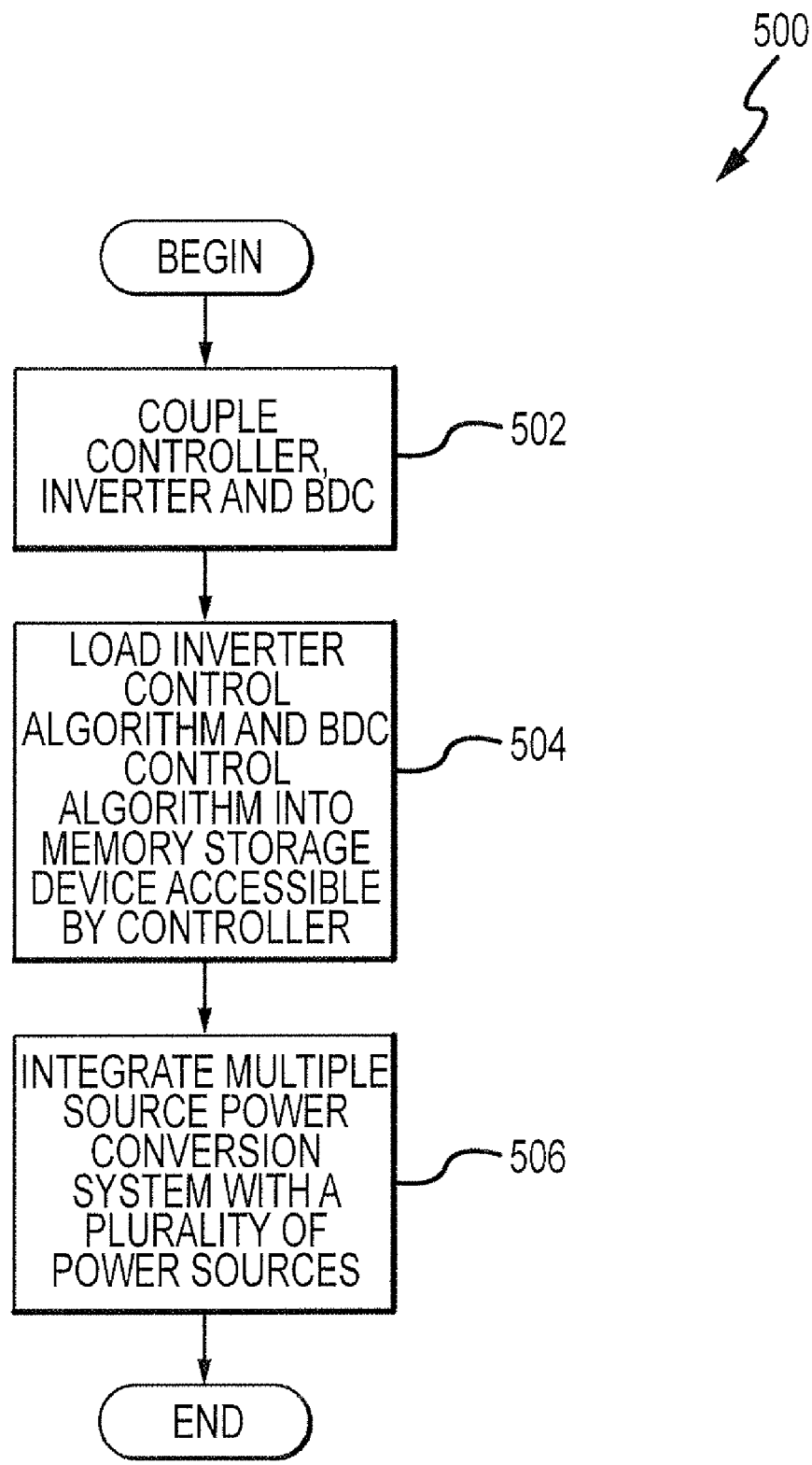
FIG. 5 is a flowchart of method for manufacturing a multiple source power conversion system, in accordance with an example embodiment.

FIG. 5 is a flowchart 500 of method for manufacturing a multiple source power conversion system, in accordance with an example embodiment. In block 502, a controller (e.g., controller 328, FIG. 3), an inverter (e.g., inverter 319, FIG. 3), and a BDC (e.g., BDC 320, FIG. 3) are coupled together. In an embodiment, these components are coupled together in a single housing (e.g., housing 350, FIG. 3). Other components also may be coupled with the controller, inverter, and/or BDC, including for example, one or more data storage devices (e.g., random access memory (RAM) or read only memory (ROM). In block 504, an inverter control algorithm and a BDC control algorithm are loaded into a memory storage device (e.g., RAM or ROM) that is accessible to the controller. In block 506, the multiple source power conversion system may then be integrated with a plurality of power sources, such as an AC power source (e.g., AC power source 313, FIG. 3) and one or more DC power sources (e.g., first and second DC power sources 315, 317, FIG. 3). The method may then end.

While various embodiments of systems and methods have been presented in the foregoing detailed description, it should be appreciated that a vast number of other variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A system for multiple source power conversion in a vehicle that includes a first direct current (DC) power source, a second DC power source, and an alternating current (AC) electric motor that functions as a traction device of the vehicle, the system comprising:
    an inverter having a plurality of first switches, a first DC input/output (I/O) connector, a second DC I/O connector, and an AC I/O connector, wherein the first DC I/O connector is coupled with the second DC power source, and the AC I/O connector is coupled with the AC electric motor, and wherein the the first switches are controllable to convert DC power received via the first DC I/O connector from the second DC power source into AC power, which is provided to the AC electric motor;
    a DC-to-DC converter having a plurality of second switches, a third DC I/O connector, and a fourth DC I/O connector, wherein the third DC I/O connector is coupled with the second DC I/O connector of the inverter, and the fourth DC I/O connector is coupled with the first DC power source; and
    a single controller coupled to the inverter and the DC-to-DC converter, wherein the single controller receives external commands, inverter feedback signals, and DC-to-DC converter feedback signals, and executes a first control algorithm for controlling the first switches of the inverter and a second control algorithm for controlling the second switches of the DC-to-DC converter based on the external commands, the inverter feedback signals, and the DC-to-DC converter feedback signals, wherein the single controller executes the first and second control algorithms in a cyclic manner in which, during a single switching cycle of the first and second switches, the single controller executes a portion of the first control algorithm to generate first drive signals for the first switches of the inverter and executes a portion of the second control algorithm to generate second drive signals for the second switches of the DC-to-DC converter, and wherein the controller generates the first and second drive signals so that the first switches of the inverter and the second switches of the DC-to-DC converter are synchronized to switch at a same frequency and out of phase.

2. The system of claim 1, wherein the DC-to-DC converter includes a bidirectional DC-to-DC converter.

3. The system of claim 1, wherein the first and second switches include a plurality of high frequency switching devices.

4. The system of claim 3, wherein the plurality of high frequency switching devices includes devices selected from a group that includes insulated gate bipolar transistors, metal-oxide-semiconductor field effect transistors, and integrated gate commutated thyristors.

5. The system of claim 1, further comprising:
    the first DC power source coupled with the first DC I/O connector;
    the AC electric motor coupled with the AC I/O connector; and
    the second DC power source coupled with the fourth DC I/O connector.

6. The system of claim 5, wherein the first DC power source includes a fuel cell power module, and the second DC power source includes a battery.

7. The system of claim 5, wherein the first DC power source includes a battery power module, and the second DC power source includes an ultracapacitor.

8. The system of claim 1, wherein the inverter, the DC-to-DC converter, and the controller are enclosed within one housing.

9. The system of claim 1, further comprising:
    a heat dissipation device adapted to dissipate heat generated by the inverter and the DC-to-DC converter.

10. The system of claim 1, further comprising:
    one or more electromagnetic interference (EMI) filters adapted to provide EMI filtering for the inverter and the DC-to-DC converter.

11. The system of claim 1, further comprising:
    one or more DC bus capacitors adapted to perform DC bus voltage filtering.

12. The system of claim 1, wherein the switching cycle is less than or equal to 100 microseconds.

13. An apparatus for multiple source power conversion in a vehicle that includes a first direct current (DC) power source, a second DC power source, and an alternating current (AC) electric motor that functions as a traction device of the vehicle, the apparatus comprising:
    a single controller that executes an inverter control algorithm and a DC-to-DC converter control algorithm, wherein the single controller executes the inverter control algorithm and the DC-to-DC converter algorithm in a cyclic manner in which, during a single switching cycle of first and second switches of an inverter and a DC-to-DC converter, the single controller executes a portion of the inverter control algorithm to generate first drive signals for the first switches of the inverter and executes a portion of the DC-to-DC converter algorithm to generate second drive signals for the second switches of the DC-to-DC converter, and wherein the controller generates the first and second drive signals so that the first switches of the inverter and the second switches of the DC-to-DC converter are synchronized to switch at a same frequency and out of phase;
    the inverter coupled to the single controller and controlled by the inverter control algorithm, the inverter having the first switches, a first DC input/output (I/O) connector, a second DC I/O connector, and an AC I/O connector, and wherein the inverter converts DC power received via the first DC I/O connector from the second DC power source into AC power, which is provided to the AC electric motor; and
    the DC-to-DC converter coupled to the single controller and controlled by the DC-to-DC converter control algorithm, the DC-to-DC converter having the second switches, a third DC I/O connector and a fourth DC I/O connector, wherein the third DC I/O connector is coupled to the second DC I/O connector, wherein the inverter control algorithm and the DC-to-DC converter control algorithm communicate variables within the single controller for coordinating three-way power transfer among the AC electric motor, the first DC power source, and the second DC power source.

14. The apparatus of claim 13, wherein the DC-to-DC converter includes a bidirectional DC-to-DC converter.

15. The apparatus of claim 13, wherein the first switches of the inverter and the second switches of the DC-to-DC converter include a plurality of high frequency switching devices.

16. The apparatus of claim 15, wherein the plurality of high frequency switching devices includes devices selected from a group that includes insulated gate bipolar transistors, metal-oxide-semiconductor field effect transistors, and integrated gate commutated thyristors.

17. A method for multiple source power conversion between an alternating current (AC) electric motor that functions as a traction device of a vehicle, a first direct current (DC) power source of the vehicle, and a second DC power source of the vehicle, the method performed by a single controller of the vehicle and comprising the steps of:
receiving external commands from a remote source;
receiving inverter feedback signals from an inverter;
receiving DC-to-DC converter feedback signals from a DC-to-DC converter;
executing an inverter control algorithm in order to generate first drive signals for first switches of the inverter based on the external commands and the inverter feedback signals; and
executing a DC-to-DC converter control algorithm in order to generate second drive signals for second switches of the DC-to-DC converter based on the external commands and the DC-to-DC converter feedback signals,
wherein at least some of the first drive signals cause the inverter to convert DC power received from the second DC power source into AC power, and to provide the AC power to the AC electric motor, and
wherein the single controller executes the inverter control algorithm and the DC-to-DC converter algorithm in a cyclic manner in which, during a single switching cycle of the first and second switches, the single controller executes a portion of the inverter control algorithm to generate the first drive signals for the inverter and executes a portion of the DC-to-DC converter control algorithm to generate the second drive signals for the DC-to-DC converter, and wherein the controller generates the first and second drive signals so that the first switches of the inverter and the second switches of the DC-to-DC converter are synchronized to switch at a same frequency and out of phase.

18. The method of claim 17, wherein the step of receiving the external commands includes receiving at least one command selected from a group that includes motor speed commands, torque commands, DC-to-DC power commands, and/or current commands.

19. A method of manufacturing a system for power conversion between multiple power sources in a vehicle that includes an alternating current (AC) electric motor that functions as a traction device of the vehicle and at least two direct current (DC) power sources, the method comprising the steps of:
electrically coupling together a single controller, an inverter having first switches, and a bi-directional DC-to-DC converter (BDC) having second switches; and
storing an inverter control algorithm and a BDC control algorithm in a data storage device that is accessible to the single controller, wherein the inverter control algorithm and the BDC control algorithm are executable by the single controller in a cyclic manner, and result in the single controller producing drive signals that cause the inverter to convert DC power received from the at least two DC power sources into AC power, and to provide the AC power to the AC electric motor, wherein execution in the cyclic manner includes the single controller, during a single switching cycle of the first and second switches, executing a portion of the inverter control algorithm to generate first drive signals for the inverter and executing a portion of the BDC control algorithm to generate second drive signals for the BDC, and wherein the first and second drive signals are generated so that the first switches of the inverter and the second switches of the DC-to-DC converter are synchronized to switch at a same frequency and out of phase.

20. The method of claim 19, further comprising:
coupling the AC electric motor to an AC input/output (I/O) connector of the inverter;
coupling a second DC power source of the at least two DC power sources to a first DC I/O connector of the inverter;
coupling a second DC I/O connector of the inverter to a third DC I/O connector of the BDC; and
coupling a second DC power source of the at least two DC power sources to a fourth I/O connector of the BDC.

* * * * *